July 15, 1941.      L. A. GUNTHER      2,249,130
IRRIGATION MACHINE
Filed Oct. 3, 1938      2 Sheets-Sheet 2

INVENTOR
L. A. Gunther
BY
ATTORNEY

Patented July 15, 1941

2,249,130

UNITED STATES PATENT OFFICE 2,249,130

IRRIGATION MACHINE

Leo A. Gunther, Knights Landing, Calif.

Application October 3, 1938, Serial No. 233,097

3 Claims. (Cl. 61—12)

This invention relates to portable irrigation machines, adapted to be operated over substantially level ground, to irrigate low growing crops, and which takes its water from a supply ditch running through the area to be irrigated.

The principal object of my invention is to provide a machine adapted to travel alongside a ditch, and arranged so that water from the ditch will be delivered onto the land on both sides of the machine and to all points on the land simultaneously from adjacent the machine to considerable distances laterally therefrom.

A further object is to provide a machine for the purpose which may conveniently be used either for overhead sprinkling or for ground level irrigation.

When used in the latter manner, the water is delivered onto the ground through hoses spaced apart a distance the same as the spacing between alternate rows of plants, and the machine is thus admirably suited for the irrigation of various crops such as beans, beets and the like when such crops are planted in rows paralleling the water supply ditch. Of course if the overhead sprinkling method is employed, the arrangement of the rows relative to the ditch is immaterial.

As a result of the use of this machine, considerable savings in labor and time are effected, since it is no longer necessary to run or pump the water from the ditch into the individual row ditches at one end, or at intermediate points, and which usually requires the use of men with shovels to keep the water flowing evenly in order to prevent excessive irrigation at some places and insufficient at others. In fact with my machine, actual ditches are hardly necessary, since the water is definitely delivered by the machine onto the ground between the various rows.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a fragmentary side elevation of the machine showing particularly the arrangement of the suction pipe of the pump.

Figure 4 is a fragmentary side view of one of the delivery pipe units.

Figure 5 is a transverse section of the same.

Referring now more particularly to the characters of reference on the drawings, the machine comprises a self-propelled chassis having a frame 1 carried on front steerable wheels 2 and rear driven wheels 3, the latter being driven at a very low speed when in operation (about 6 feet per minute) by any suitable drive connections of conventional type with a power plant 4 mounted on the chassis. The usual spring mounting of the wheels is omitted to eliminate lateral swaying of the chassis as much as possible.

Figure 1:
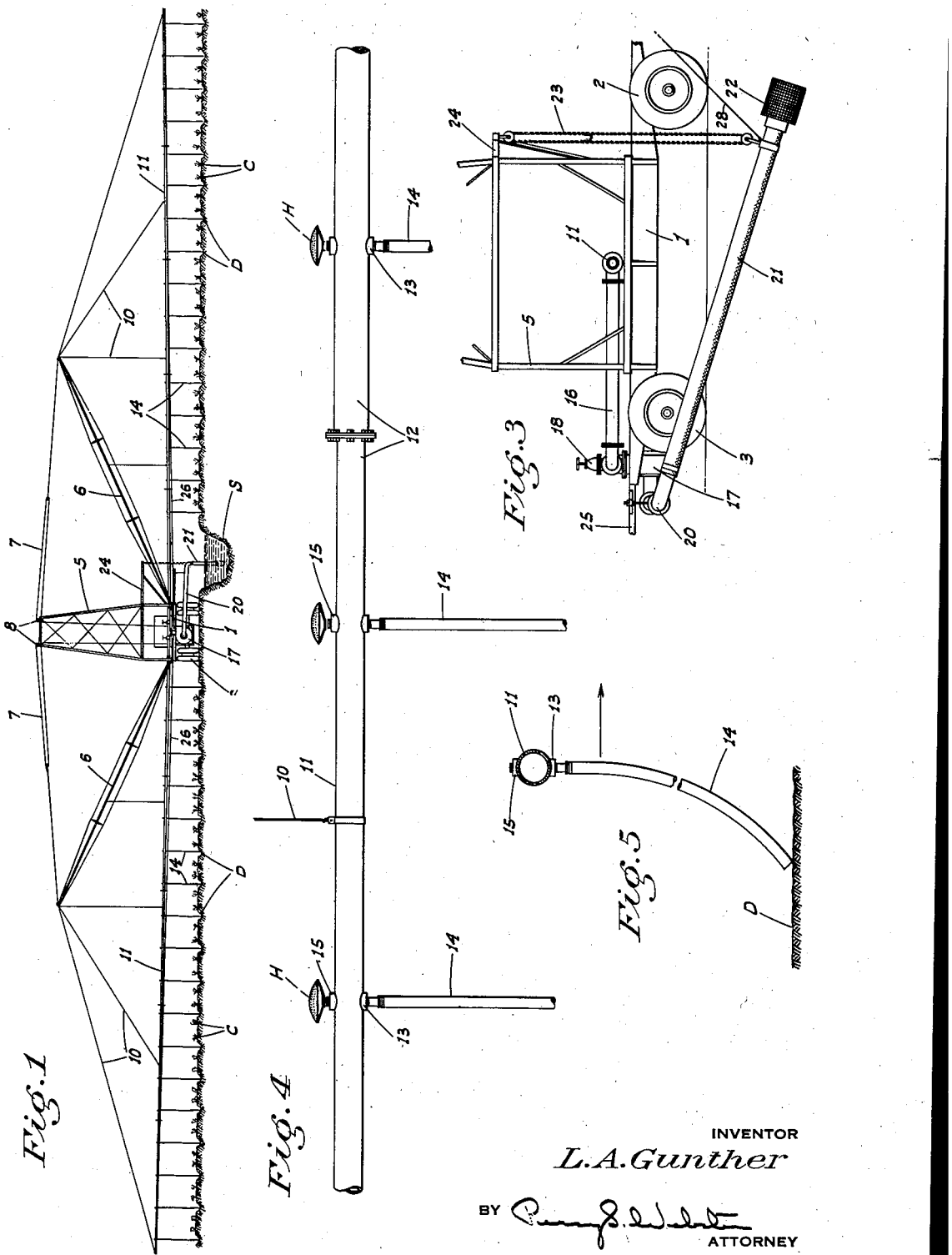
Figure 1 is a rear end elevation, somewhat diagrammatic, of my improved irrigation machine as in operation.
Figure 2:
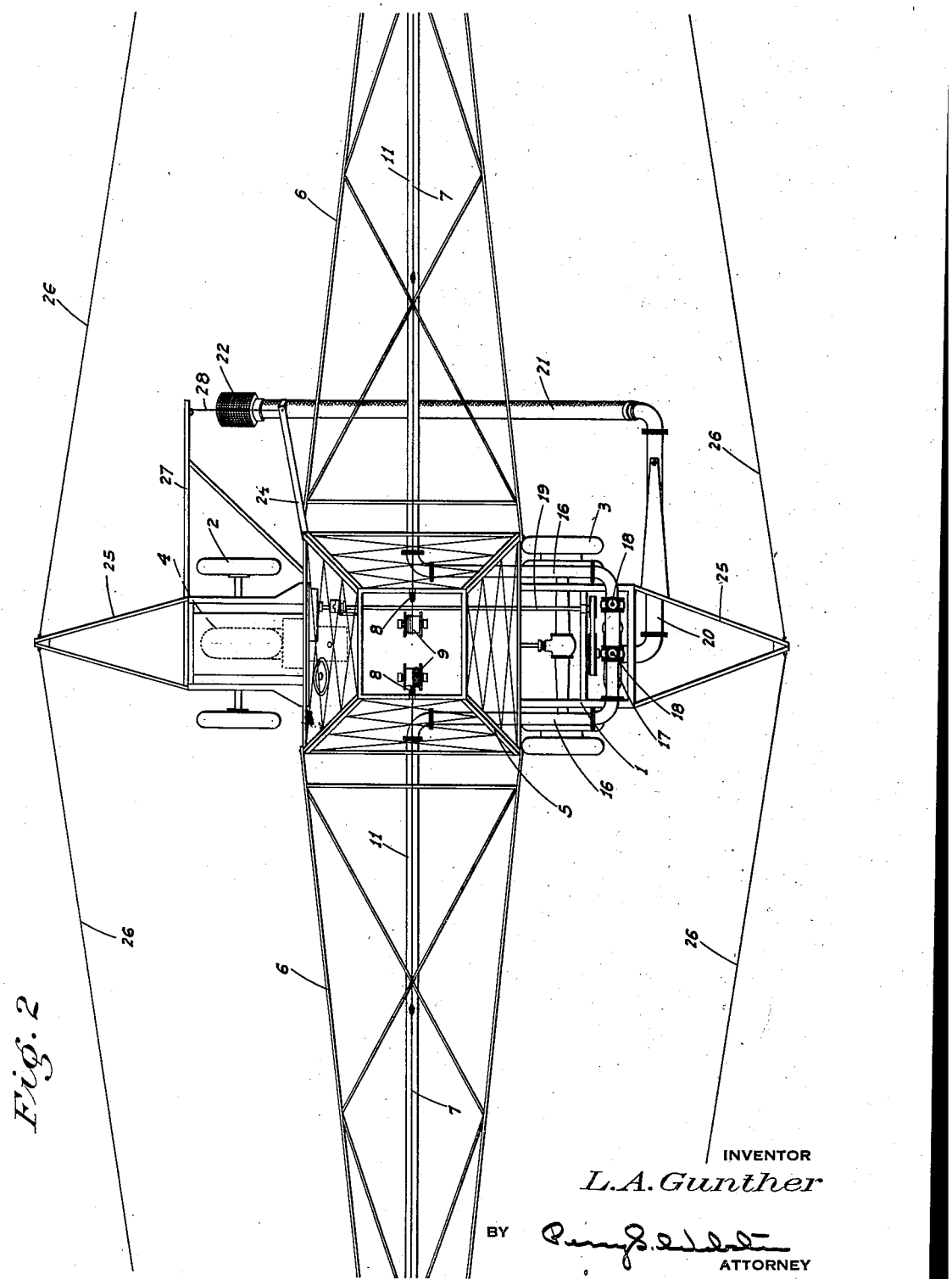
Figure 2 is a fragmentary top plan view of the same.

Mounted on the frame is a tower 5, pivoted booms 6 projecting laterally from the boom at the base and on opposite sides. The booms are supported and raised and lowered by cables 7 extending from the outer end of the booms over pulleys 8 on top of the tower and down to winches on the chassis and indicated diagrammatically at 9 in Fig. 2.

The booms in turn support, by means of suspension cables 10, the relatively long and substantially horizontal delivery pipe units denoted generally at 11. These units extend laterally from the chassis centrally of the booms at the base thereof and extend outwardly a considerable distance, 100 feet or so. The units are made of light weight pipe, each unit being preferably formed of a number of flange-ended sections 12 of gradually decreasing size bolted together as shown in Fig. 4.

The pipe sections are provided at intervals and at the bottom with tapped outlet fittings 13, spaced apart along the unit the same as the spacing of the ditches D of the row crops C to be irrigated. Lengths of flexible hose 14 depend from the various fittings and are long enough to drag on the ground in the ditches as indicated in Fig. 5. In this manner the water will be delivered into the ditches in a horizontal direction as is desirable.

The pipe sections may also be provided with outlet fittings 15 on top, to receive sprinkler heads H. Both these heads and hoses 14 may be used simultaneously but if either is omitted, the corresponding fittings are plugged.

The pipe units at their lower end are joined to longitudinally extending pipes 16 which project rearwardly to a connection with the outlet of a pump 17 of suitable type and size mounted on the frame 1 at its rear end. Control valves 18 are interposed in the pipes 16 near the pump so that water may be shut off from one or the other of the pipe units. The pump is driven from the power plant 4 by suitable connections as indicated at 19 in Fig. 2, or it may be driven by a separate power plant.

The intake pipe 20 of the pump extends laterally beyond one side of the chassis some distance and is connected at its outer end with a forwardly extending flexible conduit 21 having a suction screen head 22 on its forward end. This conduit when in operation is disposed with a forward and downward slant so that the screen head is below water level in the supply ditch S. The conduit is supported at the desired level, or raised clear of the ditch, by suitable means such as a chain hoist 23 connected to the conduit near its forward end and suspended from a bracket 24 projecting from the adjacent side of the tower (see Fig. 3).

The booms and the depending cables 10 of course support the long pipe units against relative deviation in a vertical plane. The pipe units may be elevated at their outer ends a certain distance by lifting the booms by means of cables 7, said units being capable, on account of their light construction, of flexing without damage between the tower and the adjacent suspension cables 10. Of course for transporting the apparatus from one locality to another, it may be necessary to detach the pipe units from the machine, but this can easily be done on account of the flange connections used.

In order to support the pipe units against horizontal deviation or swaying, extension frames 25 project from the front and back of the frame 1; guy wires 26 leading to the pipe units being connected to the outer ends of the extension frames. Since the guy wires are substantially horizontal and in line with the normal position of the pipe units, they do not interfere with the elevating of the same when necessary.

The tower, booms and pipe units are made as light as possible consistent with the necessary strength, in order that the machine as a whole shall not be excessively heavy. The units extending equally on opposite sides of the tower, the machine is substantially balanced and does not tend to tilt to one side or the other.

In order to prevent rearward deflection of the forwardly extending flexible intake conduit 21, I mount a laterally extending arm 27 on the front end of the chassis. From the outer end of this arm, an adjustable cable 28 depends to a connection with conduit 21 adjacent its forward end.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An irrigation machine comprising a wheel supported chassis movable lengthwise of a water supply ditch to one side of the same, a pump mounted on the chassis and having an outlet conduit adapted to deliver onto the land, a water intake conduit connected to the pump and including a flexible portion extending lengthwise and at a forward and downward slope relative to the chassis from adjacent the rear end and on one side thereof to a termination rearwardly of and normally below the front end of the chassis, a rigid arm projecting laterally from said one side of the chassis ahead of the intake conduit termination and a tension member extending downwardly and rearwardly between said arm and the intake conduit adjacent said termination.

2. A structure as in claim 1 with an additional adjustable vertical tension member between the chassis and intake conduit adjacent said termination thereof.

3. An irrigation machine comprising a wheel supported frame movable along the ground parallel to and adjacent a water supply ditch, a tower on the frame, a boom projecting laterally at an upward slope from the base of the tower, a water conduit projecting laterally and normally substantially horizontally from the frame under the boom, said water conduit being of substantially greater length than the boom, a cable connected between the top of the tower and outer end of the boom, another cable connected between the outer end of the boom and outer end portion of said conduit, a third cable connected between the outer end of the boom and said conduit intermediate its ends, means to supply water to said conduit, and discharge elements mounted along said conduit in longitudinally spaced relation.

LEO A. GUNTHER.